United States Patent [19]

Krieg

[11] 4,040,527

[45] Aug. 9, 1977

[54] INSTALLATION FOR MANUFACTURING MOTOR VEHICLES OR OTHER PRODUCTS COMPRISING A NUMBER OF COMPONENT ELEMENTS

[75] Inventor: Walter Krieg, Brugg, Switzerland

[73] Assignee: Digitron AG., Brugg-Biel, Switzerland

[21] Appl. No.: 539,734

[22] Filed: Jan. 9, 1975

[30] Foreign Application Priority Data

Jan. 21, 1974 Germany ............................ 2402665

[51] Int. Cl.² ............................................. E04H 6/06
[52] U.S. Cl. ........................ 214/16.4 A; 214/16.4 C; 180/98
[58] Field of Search ............ 214/1 R, 11, 1 P, 16.1 R, 214/16.1 CC, 16.1 CD, 16.1 CE, 16.1 CF, 16 B, 16.4 R, 16.4 A, 16.4 B, 16.4 C; 180/98; 198/127 R; 105/159

[56] References Cited

U.S. PATENT DOCUMENTS

| 622,323 | 4/1899 | Bonner .................................. 105/159 |
| 2,489,024 | 11/1949 | Gaynor ........................... 105/159 X |
| 2,670,859 | 3/1954 | Zeckendorf et al. ........ 214/16.1 CE |
| 3,042,228 | 7/1962 | Frangos ...................... 214/16.1 CE |
| 3,079,015 | 2/1963 | Sinclair et al. .............. 214/16.1 CE |
| 3,240,364 | 3/1966 | Kapnek et al. .............. 214/16.1 CE |
| 3,390,791 | 7/1968 | Baldwin et al. ............. 214/16.1 CC |
| 3,608,745 | 9/1971 | Pohl et al. ................... 214/16.1 CC |
| 3,667,564 | 6/1972 | Schnell ..................................... 180/98 |
| 3,669,206 | 6/1972 | Tay et al. ................................. 180/98 |
| 3,680,718 | 8/1972 | Miyachi ....................... 214/16.1 CE |

FOREIGN PATENT DOCUMENTS

| 1,038,599 | 5/1953 | France ............................... 214/16 B |
| 660,454 | 2/1964 | Italy .............................. 214/16.1 CE |
| 316,417 | 10/1969 | Sweden .......................... 214/16.4 C |
| 595,435 | 12/1947 | United Kingdom ........ 214/16.1 BB |
| 300,412 | 3/1972 | U.S.S.R. ............................... 105/367 |

OTHER PUBLICATIONS

15 Ways to Control Moving Materials; Control Engineering, Sept. 1968, p. 90.

Automatic Sorting Methods; Mechanical Handling, Mar. 1969, p. 70.

Primary Examiner—Robert J. Spar
Assistant Examiner—R. B. Johnson
Attorney, Agent, or Firm—Blanchard, Flynn, Thiel, Boutell & Tanis

[57] ABSTRACT

An installation for manufacturing products, for example motor vehicles, from a number of component elements, comprises transport units which convey the elements along a production line. Each transport unit comprises a truck part and a removable platform part which carries the element. Means are provided for lifting the platform part relative to the truck part and for centering the platform part relative to the truck part.

6 Claims, 11 Drawing Figures

INSTALLATION FOR MANUFACTURING MOTOR VEHICLES OR OTHER PRODUCTS COMPRISING A NUMBER OF COMPONENT ELEMENTS

BACKGROUND OF THE INVENTION

1. Field of the Invention

The present invention relates to an installation for manufacturing products consisting of component elements, for example to an installation for manufacturing motor vehicles.

2. Description of the Prior Art

There has been proposed an installation of this type in which the component elements, secured on movable transport units by holding devices, are conveyed along a track forming a production line to storage zones in working stations and/or to associated buffer stations.

The previously proposed installation is provided with transport units, driven by electric motors, which are controllable as regards both direction of travel and speed of travel by a control conductor which extends along the track between and to the working and/or buffer stations if required. Because of this electronic control of the speed and direction of the transport units their running costs are very high, so that the proposed installation involves a high capital outlay and high maintenance costs, particularly since the necessity of buffering between the working stations requires the number of transport units to be considerably larger than the number of working stations. Also, the space required by this previously proposed installation as regards the buffer stations is uneconomically large, since in these stations the transport units can only be placed side by side in readiness to be called upon.

SUMMARY OF THE INVENTION

According to the present invention, there is provided an installation for manufacturing products consisting of a number of component elements, said installation comprising transport units having holding means for securing the elements to the units, said units being operative to convey the elements along a path forming a production line, to storage zones in working stations and/or to buffer stations, each of the transport units comprising a truck part, and a platform part for carrying the said element, said platform part including the holding means and being arranged to be set down on any required one of the truck parts by lifting means, centering means being provided to align the platform part on the truck part.

Further according to the present invention, there is provided a transport unit for use in an installation for manufacturing products from a number of workpieces said unit comprising a truck part, a supporting part for carrying a workpiece, said supporting part being removably locatable on the truck part, and means for centering the supporting part relative to the truck part.

In a preferred embodiment of the installation, the centering means are formed by guide surface elements which co-operate in the course of the movement in which the platform parts are lowered onto the truck parts and are in each case arranged so as to be dimensionally identical on the associated part of the transport unit. Preferably the guide surface elements are formed by guide bars on one of said parts of the transport unit, the bars extending at an angle, for instance perpendicularly, to one another, and by guide roller groups on the other part of the unit, the bars being received between the rollers so as to be stabilized in two dimensions horizontally. The centering means which thus co-operate with little friction can be made relatively inexpensively if the guide bars are formed on the platform part by at least one longitudinal beam and at least two spaced transverse beams, and the guide rollers are mounted on the truck in at least two roller groups each associated with a respective one of the beam intersections.

The separability of the platform parts from the truck parts enables the buffer stations to be formed with a plurality of storeys and lift installations. In this case it is advantageous for the platform parts to be provided with travelling rollers which project freely when the platform part is set down in position on the associated truck part, and for the storeys of the buffer stations to be provided with travelling rails for the travelling rollers of the platform parts and with centering means which act on the longitudinal beams of these platform parts so as to stabilize them transversely. Such centering means can comprise at least two rollers, with wedge-shaped grooves, which are at a distance from one another and of which the axes are parallel to one another, and which are preferably so arranged as to accommodate the longitudinal beam of each platform part simultaneously in the grooves and establish a frictional driving connection therewith, the grooved rollers being adapted to be coupled with an associated driving installation. By this means, accurate lateral stabilization of the platform parts in the storeys can be obtained at a relatively low cost of construction, and, if required, the drive of the grooved rollers can be used to effect advance of the platform parts, for example to and from the lift installations.

Lifting means, manipulators or similar conveying means, which are aligned with the platform parts and are rigidly connected to the platform parts, are preferably arranged in at least some of the working stations. Such conveying means enable the platform parts with the component elements secured thereto, to be lifted from the storage zones and brought into advantageous working positions for the working processes, and to be put back in very accurate alignment in the storage zone after the work has been carried out.

Continuous operation of the working cycles in the working stations can be effected if at least some of the working stations are provided with two storage zones, each for one of the platform parts. This eliminates the interruptions of work, between the working cycles, which would otherwise occur during the time required for lifting the platform parts from the truck parts and placing the platform parts on the truck parts. The duplication of the storage zones makes possible a system in which, during work at one storage zone, a second platform part is already being set down at the second storage zone, so that after completion of work at the first storage zone, work can be begun without delay at the second storage zone, while one of the truck parts picks up the platform part at the first storage zone and conveys it to the buffer station of the next working station.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

The installation shown in the drawings is particularly applicable to the manufacture of automobiles or other motor vehicles 1, which are made by assembling a relatively large number of component elements. Assembly takes place along a production line indicated both by dot-dash lines 2 and by dotted lines 3 in FIG. 1, and extending to and between working stations A, B, C...M, and buffer stations N, O which may be associated with the working stations. During progressive assembly, the component elements of the vehicles 1 are conveyed along the line 2, 3 to the working stations A to M on transport units 4 which are moved and controlled, in a manner described in further detail hereinafter, along a track forming the production line 2, 3.

Figure 2:
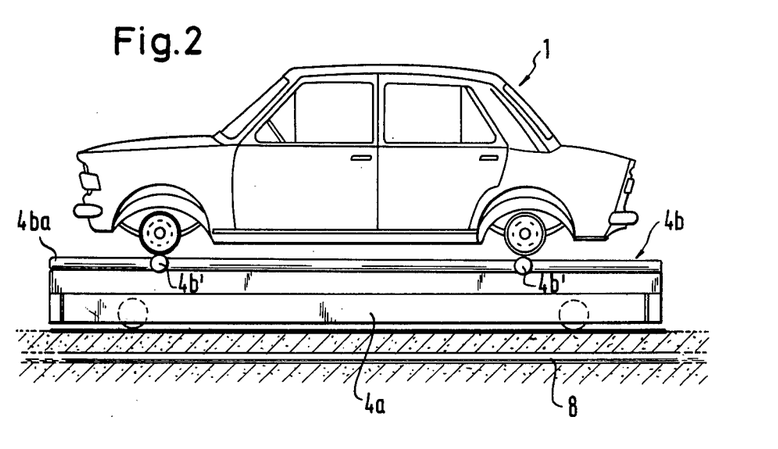
FIG. 2 is a side elevation of a transport unit of the installation.
Figure 3:
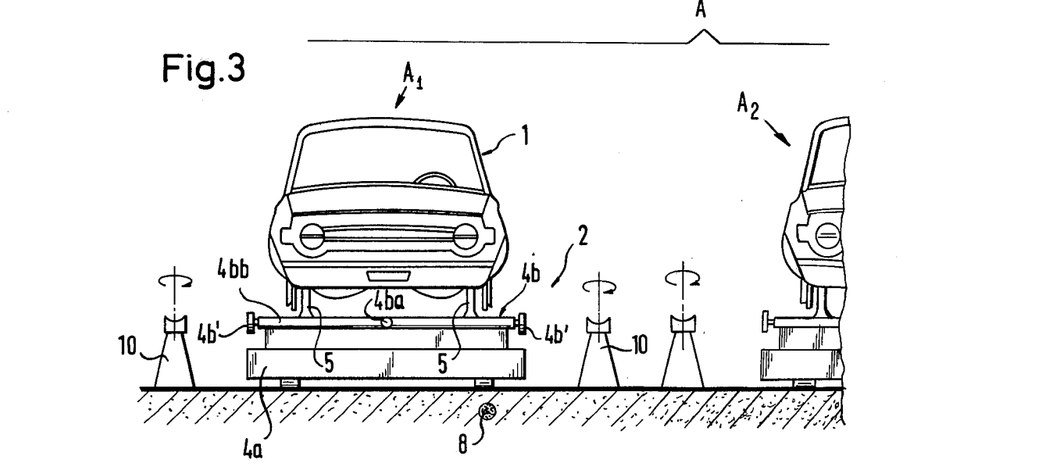
FIGS. 3 and 4 are end elevations of the transport unit.
Figure 4:
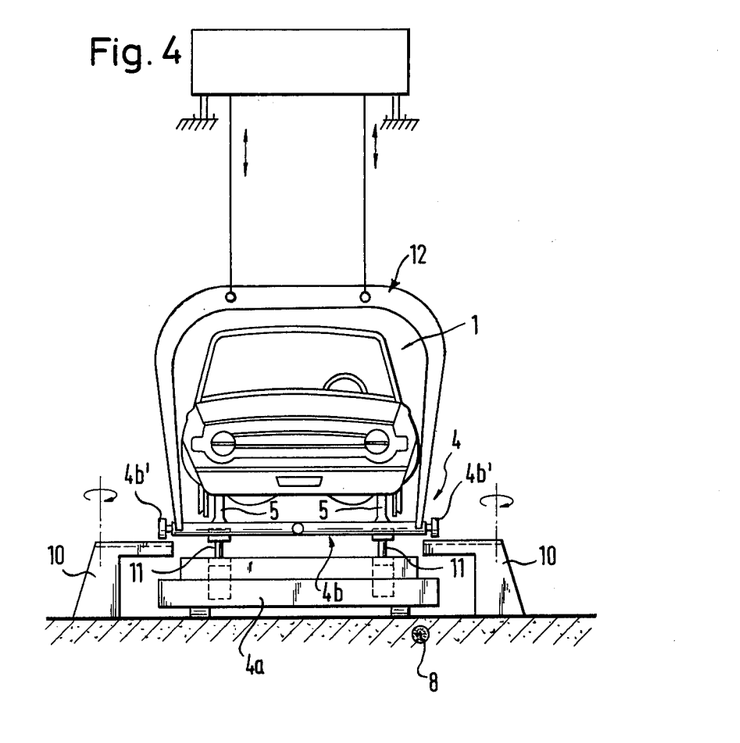

As can be seen from FIGS. 2 to 5 and more particularly from FIG. 4, each transport unit 4 comprises a truck part 4a and a workpiece platform or supporting part 4b which can be set down on any of the truck parts and which is equipped with holding devices 5 for the component elements of the vehicle 1.

Figure 6:
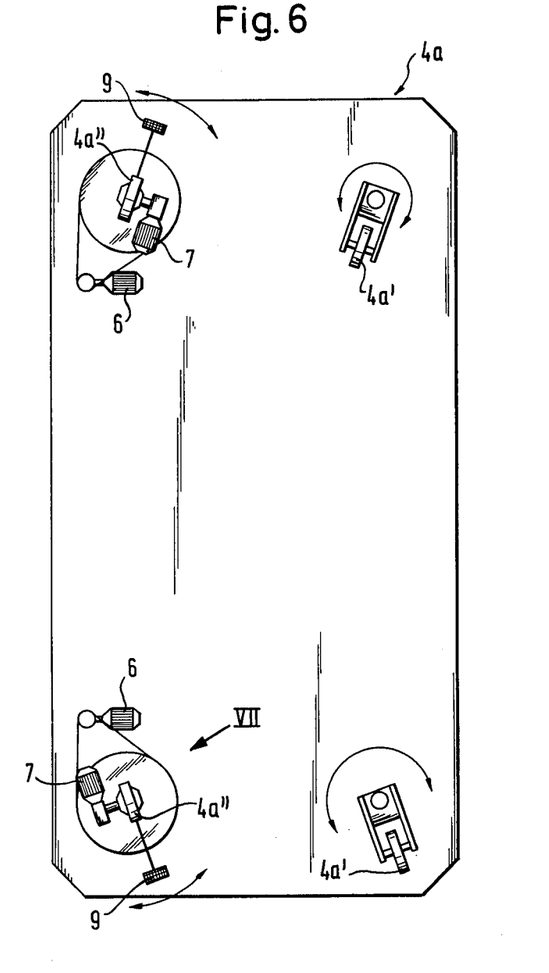
FIG. 6 is a bottom plan view of the transport unit.
Figure 7:
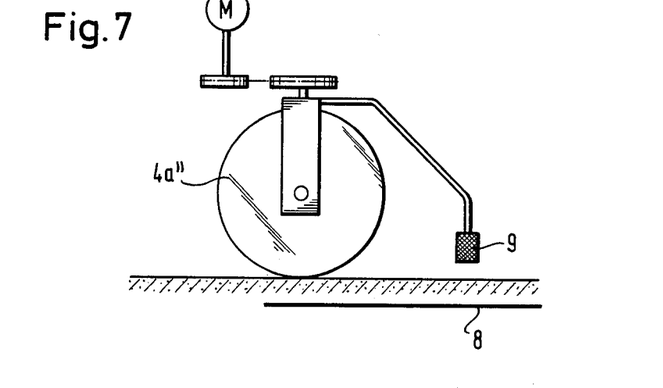
FIG. 7 is a fragmentary side elevation, to an enlarged scale of a detail VII of FIG. 6.

As shown in FIG. 6, each of the truck parts 4a is equipped on one longitudinal side with wheels 4a' which are mounted so as to be self-steering, and on the other longitudinal side with wheels 4a'' positively steered by an electric adjusting motor 6 and each coupled to a respective electric driving motor 7. This is preferably supplied with power by an accumulator battery (not shown) arranged on the truck part 4a and is electronically pulse-controlled, as regards its speed, by a control conductor 8 which is embedded beneath the production line 2,3 in the region of the station, as shown in FIGS. 2 to 4.

A directional control of the truck parts 4a along the production line 2, 3 is also effected electronically by the control conductors 8 which act inductively on aerials 9 which are arranged to pivot together with the steerable wheels 4a'' and which are associated with electronic control devices of the adjusting motors 6; these devices are not shown in the drawings.

At least some of the working stations A to M have two associated storage zones $A_1, A_2 \ldots M_1, M_2$ for the workpiece platform parts 4b. In the embodiment shown, each of the working stations has two associated storage zones. As shown in FIG. 3, each platform part 4b on its associated truck part 4a can be located between support structures 10 of the respective storage zone. At the storage zone, the workpiece platform part 4b can be lifted off its associated truck part 4a by means of a lifting device 11, and lowered on to the support structures which are, for example, so formed that they can be swung inwardly about vertical axes from the position shown in FIG. 3 to the position shown in FIG. 4, under the raised workpiece platform part 4b and under travelling rollers 4b' mounted on the part 4b and extending laterally outwardly with respect to the truck part 4a.

In contrast to the embodiment illustrated in which each of the truck parts 4a is provided with a respective lifting device 11, these devices may alternatively be mounted in fixed positions in the working stations A . . . M at their storage zones A1, A2 . . . M1, M2, or the support structures 10 may be vertically displaceable to perform the function of the lifting devices.

Figure 5:
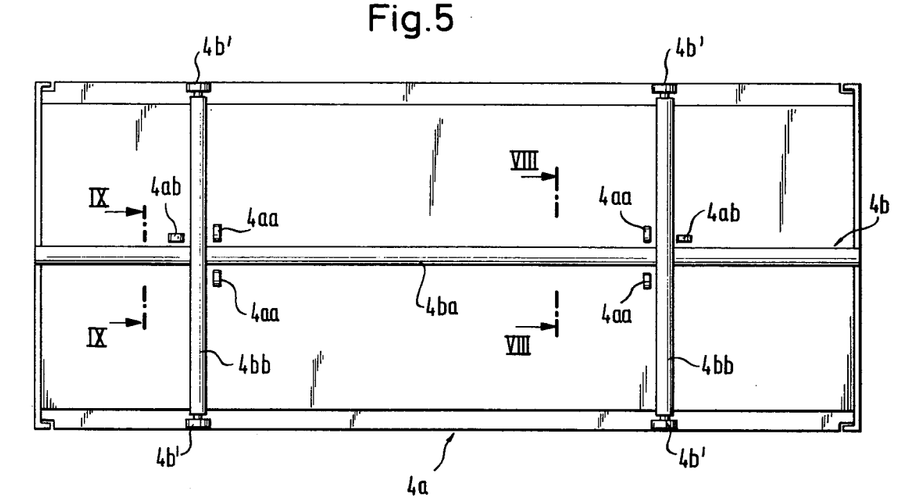
FIG. 5 is a top plan view of the transport unit.
Figure 8:
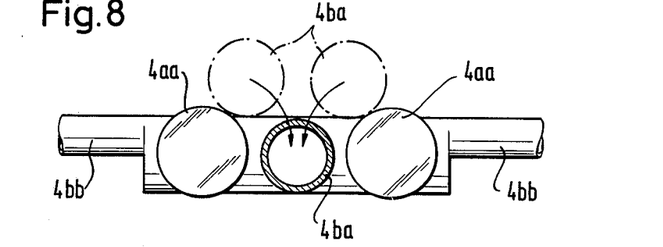
FIG. 8 is a section, to an enlarged scale, taken on line VIII—VIII of FIG. 5.
Figure 9:
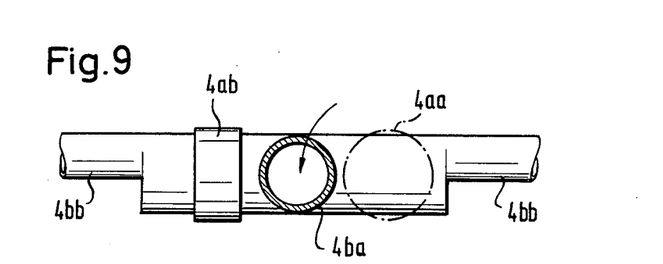
FIG. 9 is a section, to an enlarged scale, taken on line IX—IX of FIG. 5.

As shown in FIG. 5, each workpiece platform part 4b comprises at least one longitudinal beam 4ba and two transverse beams 4bb at a distance from one another, and as shown in FIGS. 8 and 9, all the beams are of circular cross-section. The beams 4ba and 4bb thus perform the function of guide bars or guide surface elements extending at an angle, for instance perpendicularly, to one another, which in the course of the movement in which the platform part 4b is lowered on to the truck part 4a, co-operate with further guide surface elements, for instance guide rollers 4aa and 4ab, arranged on the truck part 4a. These rollers are arranged on the truck part 4a in at least two roller groups each associated with a respective one of the node or intersection points of the beams 4ba and 4bb of the workpiece platform part 4b in such a manner that each roller group receives the guide beams 4ba, 4bb of the workpiece platform part 4b between the rollers in the course of the downward movement of the platform part 4b in such a manner as to stabilize and center the platform part in two dimensions, horizontally. Such centering means on the different truck parts 4a and on the different platform parts 4b are identical as regards dimensions and therefore any workpiece platform part 4b can be set down on any truck part 4a. In order to permit centering movements of the workpiece platform part 4b relative to the truck part 4a while the platform part 4b is being lowered by the lifting device 11, the lifting device is either floatingly mounted or is so constructed as to have a horizontally displaceable action on the workpiece platform part 4b.

As indicated in FIG. 4, in at least some of the working stations A . . . M horizontally displaceable lifting devices 12, manipulators or similar conveying devices may be arranged in association with the storage zones $A_1, A_2 \ldots M_1, M_2$, of these working stations and may be formed so as to be aligned with the workpiece platform parts 4b set down on the support structures 10 and rigidly connectable to these platform parts.

Figure 1:
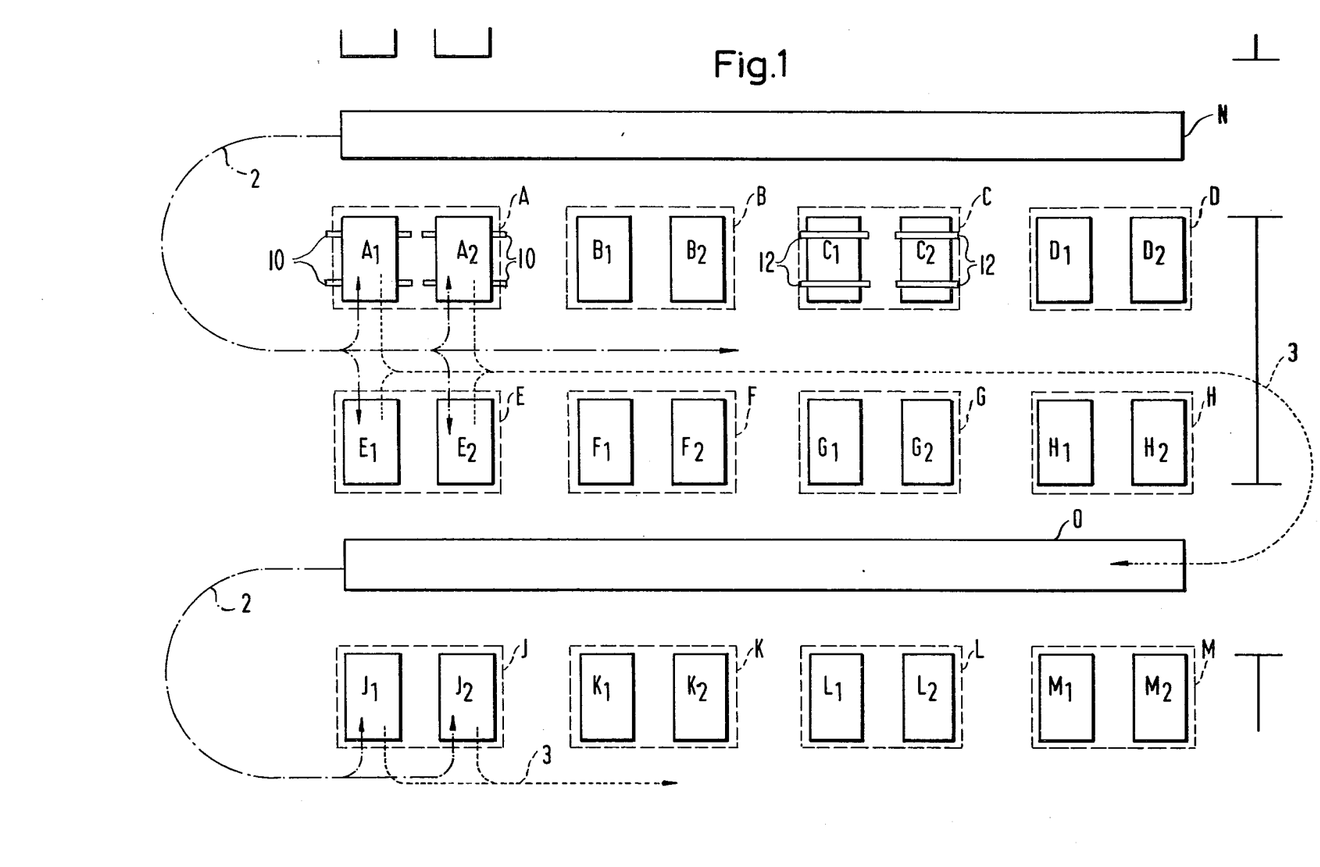
FIG. 1 is a schematic plan view of an installation in accordance with the invention.
Figure 10:
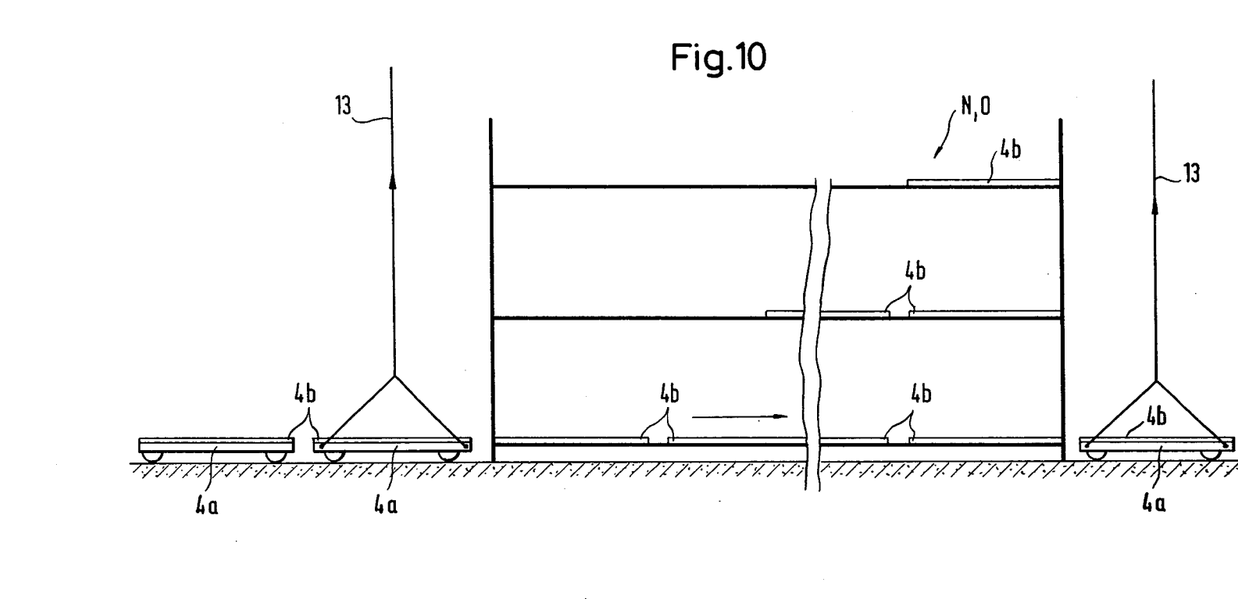
FIG. 10 is a side elevation of a buffer station of the installation.
Figure 11:
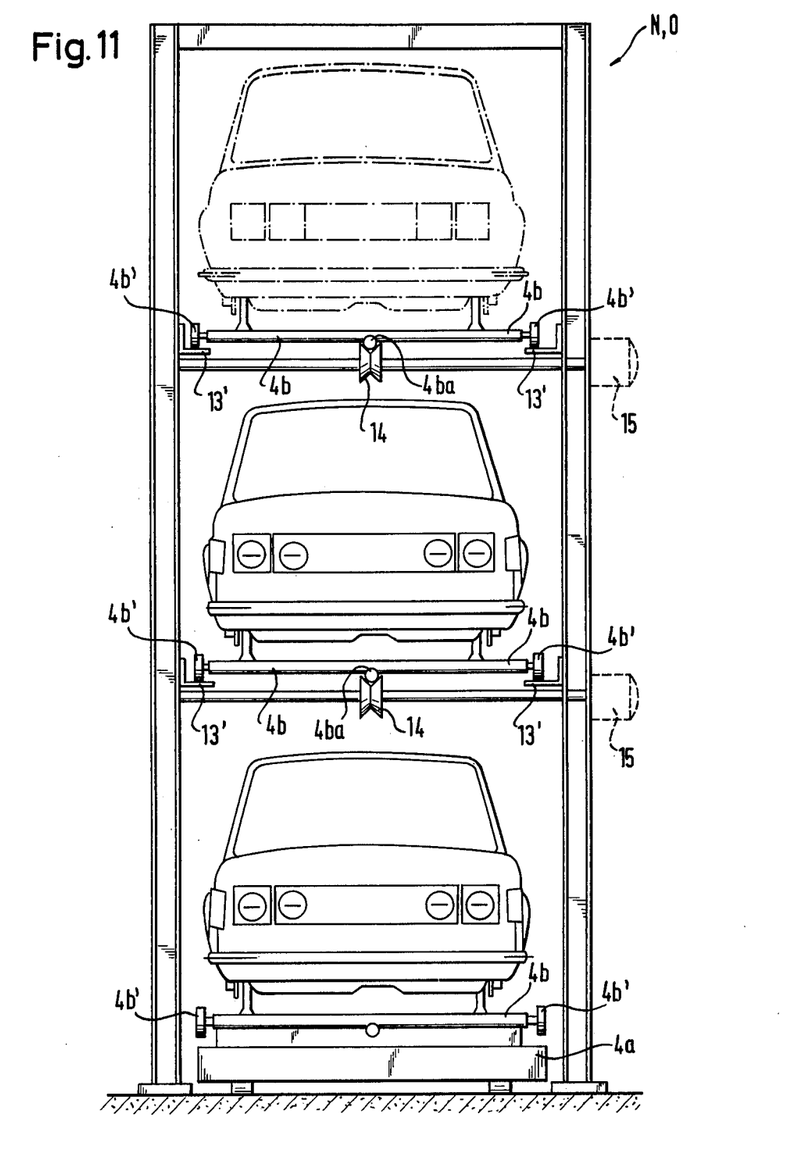
FIG. 11 is an end elevation of the buffer station.

Preferably, the buffer stations N and O shown only diagrammatically in FIG. 1 may each be formed, as shown in FIGS. 10 and 11, as continuous stores with a plurality of storys or throughput floors or the like, and with lifting means 13 operative to raise the workpiece platform parts 4b to the height of the storeys.

The storys of the buffer stations N and O are provided with travelling rails 13' which support the platform parts 4b by their rollers 4b' and with centering means, for example rollers 14 with wedge-shaped grooves, which act on the platform parts 4b so as to stabilize them transversely. In each of the storys of the buffer stations N, O these grooved rollers are arranged with their axes parallel and at intervals from one another such that always the grooves of at least two rollers 14 simultaneously receive the longitudinal beam 4ba and stabilize the platform part transversely.

Preferably the grooved rollers 14 are each formed so as to act on the longitudinal beam 4ba of the workpiece platform parts 4b, to produce a frictional connection therewith and are also adapted to be coupled to a driving installation 15 which is indicated in dot-dash line in FIG. 11.

The drive and the directional control of the truck parts 4a can be effected by means other than that shown; for example the trucks can be driven and controlled mechanically. Also, centering of the workpiece platform parts on the truck parts 4a can be effected by guide surface elements different from those illustrated.

In the installation particularly described, the construction of the transport units in the form of separate workpiece platform parts and truck parts, enables the platform parts to be stored one above another in a plurality of storys in buffer stations with lift installations, advantageously in the manner of a continuous store, whereby an economical reduction of the space required for the buffer stations is obtained. In the working stations the workpiece platform parts can be lifted off the truck parts by means of the lifting devices and set down for the whole duration of the working cycle on suitable supporting structures in the storage zones, whereupon the released truck parts can at once be used again for the transport of further workpiece platform parts. This makes it possible to ensure continuous operation of the working cycles in the stations, with a number of truck parts which is considerably less than the number of platform parts. Because of the electronic speed and direction control which is provided on each truck part, the truck parts involve considerably higher capital and maintenance costs than the platform parts, and therefore these costs are economically reduced in this installation because the number of truck parts required is relatively small as compared with the number of platform parts.

In view of the precise electronic direction control of the truck parts, the centering means ensure that the workpiece platform parts set down on respective truck parts are so centered that after the platform parts have travelled into the ations, the component elements on the platform parts are very accurately aligned in the working position and with respect to manipulators which may be associated with the stations. In the absence of such centering means, because of the successive depositions of workpiece platform parts on truck parts guided into the corresponding stations for this purpose, a cumulative addition of the positional tolerance between the truck part and platform part could occur with the result that the platform part together with the component elements thereon would project beyond the permissible transport limits and in addition to the danger of damage and accidents which this would involve, entry into the next station according to the working plan might be impossible.

The embodiments of the invention in which an exclusive property or privilege is claimed are defined as follows:

1. An assembly line and apparatus for conveying an element along said assembly line in a manufacturing apparatus, said assembly line including guide means defining a path in said manufacturing process, said assembly line and apparatus comprising:
    truck means and drive means therefor, said truck means including control means responsive to said guide means for effecting a steering of said truck means to maintain a predefined relation of said truck means to said guide means and said path;
    first support means on said truck means;
    platform means removably mounted on said first support means and having means thereon for supporting an element, said platform means including a longitudinally extending beam and a pair of parallel and longitudinally spaced transverse beams extending transversely of said longitudinally extending beam;
    centering means on said truck means for effecting a centering of said platform means on said truck means, said centering means being positioned so that said platform means is incapable of moving in directions parallel to a theoretical plane containing said platform means and permitting a movement of said platform means only vertically relative to said truck means, said centering means engaging said longitudinally extending beam and said transversely extending beams to effect said centering of said platform means on said truck means;
    roller means mounted on said platform means, said roller means being oriented on said platform means to facilitate a rolling movement in one direction;
    work station means spaced along said path and having movable support members at spaced locations therein adapted to be moved into supporting relationship with said platform means to free said truck means from supporting said platform means and thereby facilitate a movement of said truck means to locations remote from said platform means; and
    buffer storage means located in said path, said buffer storage means having second support means thereon for engaging said platform means traveling along said path, said buffer storage means including means defining a plurality of locations for storing a plurality of said platform means, said second support means on said buffer storage means including a plurality of elongated and parallel bar supports adapted to engage said roller means for facilitating a movement of said platform means relative to said bar supports, said second means further including second centering means cooperative with said longitudinally extending beam for centering said platform means on said buffer storage means, said second centering means including at least one grooved roller rotatable about an axis perpendicular to said longitudinally extending beam, said longitudinally extending beam being received in the groove of said grooved roller.

2. An apparatus according to claim 1, including drive means for rotatably driving said grooved roller; and
    wherein said grooved roller frictionally engages said longitudinally extending beam so that said drive means effects a movement of said platform means in a direction perpendicular to said axis of rotation for said grooved roller.

3. An assembly line and apparatus for conveying an element along said assembly line in a manufacturing apparatus, said assembly line including guide means defining a path in said manufacturing process, said assembly line and apparatus comprising:
    truck means and drive means therefor, said truck means including control means responsive to said guide means for effecting a steering of said truck means to maintain predetermined relation of said truck means to said guide means and said path;
    first support means on said truck means;
    platform means removably mounted on said first support means and having means thereon for supporting an element, said platform means including a longitudinally extending beam and a pair of parallel and longitudinally spaced transverse beams extending transversely of said longitudinally extending beam;

centering means on said truck means for effecting a centering of said platform means on said truck means, said centering means being positioned so that said platform means is incapable of moving in directions parallel to a theoretical plane containing said platform means and permitting a movement of said platform means only vertically relative to said truck means, said centering means engaging said longitudinally extending beam and said transversely extending beams to effect said centering of said platform means on said truck means;

roller means mounted on said platform means, said roller means being oriented on said platform means to facilitate a rolling movement in one direction;

work station means spaced along said path and having movable support members at spaced locations therein adapted to be moved into supporting relationship with said platform means to free said truck means from supporting said platform means and thereby facilitate a movement of said truck means to locations remote from said platform means, said movable support members at said work station means being movable to positions vertically aligned with said roller means and adapted to engage said roller means to support said platform means at said work station means; and buffer storage means located in said path, said buffer storage means having second support means thereon for engaging said platform means traveling along said path, said buffer storage means including means defining a plurality of locations for storing a plurality of said platform means, said second support means on said buffer storage means including a plurality of elongated and parallel bar supports adapted to engage said roller means for facilitating a movement of said platform means relative to said bar supports, said second support means further including second centering means cooperative with said longitudinally extending beam for centering said platform means on said buffer storage means.

4. An apparatus according to claim 1, wherein at least some of said working station means include means defining two storage zones, each for one of said platform means.

5. An apparatus according to claim 3, wherein said plurality of locations in said buffer storage means are located in vertically spaced relation to each other.

6. An assembly line and apparatus for conveying an element along said assembly line in a manufacturing apparatus, said assembly line including guide means defining a path in said manufacturing process, said assembly line and apparatus comprising:

truck means and drive means therefor, said truck means including control means responsive to said guide means for effecting a steering of said truck means to maintain a predefined relation of said truck means to said guide means and said path;

first support means on said truck means, said first support means including a first lifting device for raising and lowering said platform means relative to said truck means;

platform means removably mounted on said first support means and having means thereon for supporting an element;

centering means on said truck means for effecting a centering of said platform means on said truck means, said centering means being positioned so that said platform means is incapable of moving in directions parallel to a theoretical plane containing said platform means and permitting a movement of said platform means only vertically relative to said truck means;

work station means spaced along said path and having movable support members at spaced locations therein adapted to be moved into supporting relationship with said platform means to free said truck means from supporting said platform means and thereby facilitate a movement of said truck means to locations remote from said platform means;

a second lifting device separate from said first lifting device at said work station means, said second lifting device including means for effecting a horizontal displacement thereof and said platform means engaged therewith; and buffer storage means located in said path, said buffer storage means having second support means thereon for engaging said platform means traveling along said path, said buffer storage means including means defining a plurality of locations for storing a plurality of said platform means.

* * * * *

UNITED STATES PATENT AND TRADEMARK OFFICE
CERTIFICATE OF CORRECTION

PATENT NO. : 4 040 527
DATED : August 9, 1977
INVENTOR(S) : Walter Krieg

It is certified that error appears in the above-identified patent and that said Letters Patent are hereby corrected as shown below:

Column 6, line 39; after "second" insert ---support---.

Column 7, line 48; change "1" to ---3---.

Signed and Sealed this

Twenty-second Day of November 1977

[SEAL]

Attest:

RUTH C. MASON
*Attesting Officer*

LUTRELLE F. PARKER
*Acting Commissioner of Patents and Trademarks*